Nov. 17, 1953 J. F. O'HARA 2,659,772

TELEPHONE ADAPTER FOR HEARING AIDS

Filed Sept. 13, 1948 3 Sheets-Sheet 1

INVENTOR.
JANVIER F. O'HARA
BY
James B. Christie

INVENTOR.
JANVIER F. O'HARA
BY
James B. Christie

INVENTOR.
JANVIER F. O'HARA
BY
James B. Christie

Patented Nov. 17, 1953

2,659,772

UNITED STATES PATENT OFFICE 2,659,772

TELEPHONE ADAPTER FOR HEARING AIDS

Janvier F. O'Hara, Monrovia, Calif.

Application September 13, 1948, Serial No. 48,992

12 Claims. (Cl. 179—107)

This invention relates to a hearing aid. More particularly the invention relates to apparatus to facilitate the use of telephones by people having impaired hearing.

The conventional hearing aid used by persons with subnormal hearing comprises a microphone, amplifier, amplifier batteries, and an air or bone convection ear receiver. The microphone and amplifier are generally enclosed in a case worn in an inconspicuous place about the user's person to receive and amplify sound communicated to the user. The amplifier batteries may be included in the case but also may be carried elsewhere on the person. The ear receiver, depending upon its type, is mounted in or behnid the wearer's ear and is connected to the amplifier by suitable wires.

Such apparatus is well suited for the purpose of increasing the audibility of conversational communication but is not entirely satisfactory as an aid to telephoning. This is particularly true with the more modern telephones in which the speaker and receiver are mounted on the same hand grip. Heretofore hearing aid users have had to depend on holding the telephone receiver as close as possible to the hearing aid microphone. This procedure is difficult, and results in an appreciable loss of sound volume from the telephone receiver to the hearing aid.

In accordance with the present invention I provide an efficient and at the same simple and convenient apparatus for transmitting sound from a telephone to a hearing aid. The hearing aid is used as an adjunct to my apparatus to amplify the sound transmitted thereto and to carry it to the ear receiver of the hearing aid.

I carry out my invention by the provision in a hearing aid including a microphone, amplifier, and ear receiver, the combination comprising an auxiliary sound pickup means adapted to be held against a telephone receiver, and means connected to the sound pickup means and detachably connected to the hearing aid for transmitting sound from the sound pickup means to the amplifier.

An important feature of my invention, particularly from the standpoint of convenience in use, is the provision of snap or plug-jack type connecting links in the sound carrying means between the auxiliary pickup and the hearing aid. For example, one form of the invention includes sound pickup means comprising a microphone, and sound carrying means comprising wires running from the microphone to the amplifier of the hearing aid. In this form I may connect wires directly from the amplifier to a jack mounted in the hearing aid case. Similarly, wires lead from the pickup device to a plug. Intermediate the jack in the case and the aforementioned plug I provide a so-called extension cord having a jack at one end and a plug at the opposite end. In use it is convenient to plug the extension cord into the hearing aid case, carrying the cord into a shirt pocket or boutonniere or the like so that the jack of the extension cord will be in a readily accessible location. The pickup device, together with its length of cord may be carried in the pocket, pocket book or the like. When the device is to be put in use for telephoning the pickup means may be simply and quickly plugged into the jack of the extension cord and placed against the telephone receiver. Immediately the apparatus is in operable condition and the user may commence a conversation on the telephone with no longer delay than that necessary to plug into the jack. Furthermore, the position of the amplifier and microphone case with respect to the wearer's clothing is immaterial when such an extension cord system is employed.

In a preferred embodiment of the invention the sound pickup means comprises a microphone, similar to the hearing aid microphone, disposed in a disk shaped housing which may be normally held or clipped to the telephone receiver. The microphone in the sound pickup is connected directly to the amplifier of the hearing aid, bypassing the hearing aid microphone. With the two microphones thus connected in parallel to the amplifier, it is possible for the user to hear simultaneously a telephone conversation and any other sounds originating in the vicinity of the user.

The invention will be more clearly understood with reference to the following detailed description taken in conjunction with the accompanying drawings in which.

Figure 1:
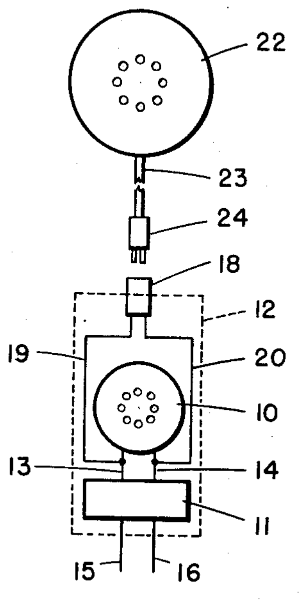
Fig. 1 is a diagrammatic view of one form of the apparatus.

Fig. 1 shows a microphone 10 and an amplifier 11 of a conventional hearing aid enclosed in a case 12. The microphone is connected by wires 13, 14 to the amplifier which in turn is connected by wires 15, 16 to the ear receiver (not shown). A jack 18 is mounted in a wall of the case 12 and is connected by wires 19, 20 to the amplifier 11 in parallel with the microphone 10. Sound pickup means 22 is adapted to be held or affixed to the telephone receiver as hereinafter described and is connected through a cable 23 to a plug 24.

In using the device of Fig. 1 the pickup means 22 is carried in a pocket or handbag and when it is desired to telephone the plug 24 is inserted into the jack 18 in the case, and the pickup 22 held or attached to the telephone receiver.

Figure 2:
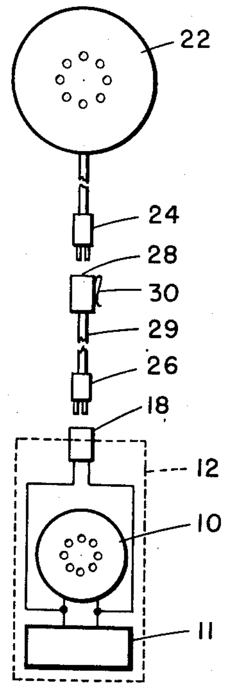
Fig. 2 is a diagrammatic view of another form of the apparatus showing the application of sound carrying extension means.

The apparatus of Fig. 2 includes the same elements as that of Fig. 1, namely microphone 10 connected to an amplifier 11 both disposed in the case 12 having a jack 18 in a wall thereof and sound pickup 22 connected to the plug 24. In this apparatus I provide an extension means having a plug 26 adapted to be inserted in the jack 18 and a jack 28 adapted to receive the plug 24, the plug 26 and the jack 28 being connected by a cable 29. With this apparatus the plug 26 may be permanently inserted in the jack 18 and carried out through the clothing to a shirt pocket or other convenient location. For this purpose the jack 28 is provided with a clip 30 by means of which it can be attached to clothing. When it is desired to use the apparatus of Fig. 2 the plug 24 need only be inserted in the jack 28 and it is ready for operation.

Figure 2A:
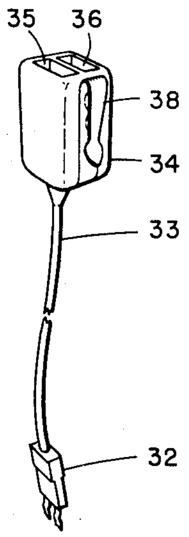
Fig. 2A is perspective detail of one form of sound carrying extension means.

One form of an extension means is shown in perspective in Fig. 2A and includes a plug 32 connected through a cable 33 to a double jack 34. The double jack 34 has a pair of sockets 35, 36, the socket 35 being connected through the cable 33 to the plug 32 and the socket 36 being a dummy and not connected to the plug 32. The jack also has a clip 38 for attaching it to clothing. The purpose of the double socket is to provide a permanent housing for a plug, say plug 24 of the apparatus of Fig. 2, that can be easily located in the dummy socket 36 and inserted in the live socket 35. This apparatus is particularly suited for men's wear inasmuch as the plug 34 may be clipped to the same shirt pocket in which the sound pickup means 22 is carried.

Figure 3:
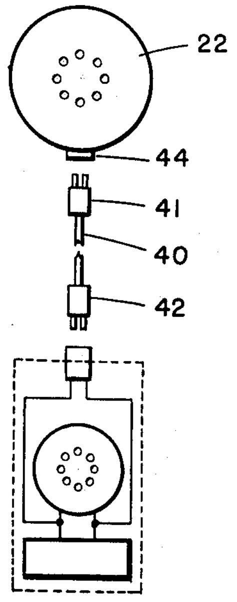
Fig. 3 is a diagrammatic view of a third form of the apparatus.

The apparatus of Fig. 3 is identical to that of Figs. 1 and 2 with the exception of the extension means 40 which is provided on either end with plugs 41, 42 and the sound pickup means which has mounted therein a jack 44.

Figure 4:
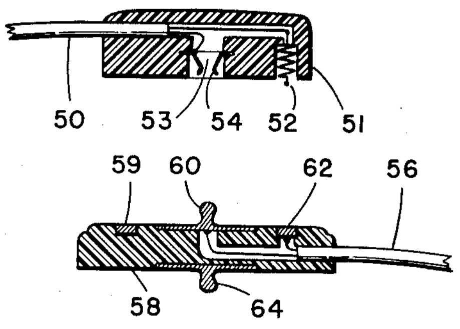
Fig. 4 is a section view of a snap fastener adapted to replace the plug jacks.

In Fig. 4 there is shown in section a snap connector which may be used to replace any of the plug jacks illustrated in the foregoing embodiments. In the snap connector, cable 50, leading from either the sound pickup means or a plug, is lead into a housing 51 and the cable wires are separated and attached to contact points 52, 53 in the bottom face of the housing. The contact 53 is an annular snap ring extending partially across a socket 54 in the housing. A second cable 56 leading to a plug tip or to the hearing aid itself is lead into a second housing 58 wherein the wires are separated and affixed to contacts 59, 60. The contact 60 forms a snap fastener adapted to engage the snap ring 53 in the socket 54. The contact 59 comprises an annular metal ring disposed in an annular groove 62. When the housings 51 and 58 are snapped together, contact 52 contacts the annular ring 59, the fastener being free to swivel without breaking the circuit. The housing 58 is provided with a second snap fastener 69 which may be snapped onto any appropriate part of the user's clothing.

Figure 5:
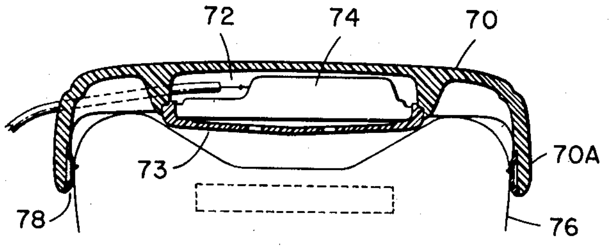
Fig. 5 is a sectional elevation of one form of sound pickup means.

A sound pickup means such as the means 22 shown in any of Figs. 1, 2 or 3 is illustrated in section in Fig. 5 and includes a case 70 having a cavity 72 enclosed by a perforated cover 73. A microphone 74 is disposed in the cavity to pick up sound issuing from the telephone receiver 76 against which the case 70 is held.

It is essential that the microphone 74 be of a type adapted to function simultaneously with the hearing aid microphone through the single amplifier. Though it is not necessary that they be identical it is convenient to employ a crystal microphone in the sound pickup if a crystal microphone is used in the hearing aid. Carbon type microphones are fast becoming obsolete in hearing aids and for all practical purposes the apparatus of the invention can be constructed with a crystal type microphone.

Case 70 in the apparatus of Fig. 5 has an annular flange 70A which extends down and around the telephone receiver 76. A resilient gasket 78 is mounted around the lower inner edge of the flange 70A to hold the housing 70 to the telephone receiver 76. This resilient gasket is shown in enlarged section in Fig. 6 and may be fabricated of rubber, resilient plastic or the like. The gasket takes the form of a hollow rib which is slightly compressed by insertion over the telephone receiver, thereby holding the housing 70 on the receiver.

Figure 7:
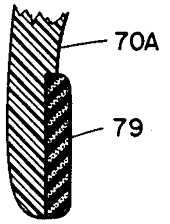
Fig. 7 is a partial sectional elevation similar to Fig. 6.

A second form of gasket is shown in Fig. 7 wherein the gasket 79 comprises an annular resilient band providing a friction fit between the annular lip 70A and the telephone receiver 76.

Figure 8:
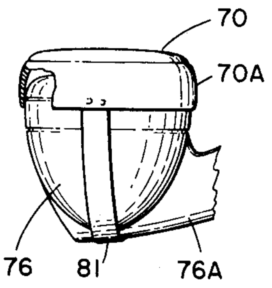
Fig. 8 is an elevation view partly in section showing one means of attaching the pickup means to the phone.

Still another means of holding the sound pickup means on the telephone receiver is shown in Fig. 8 wherein the housing 70 is provided with a flexible rubber band 81 affixed at opposite ends to diametrically opposite sides of the housing 70. By slipping the band 81 under the rib 76A of the telephone receiver the housing 70 is held against the speaker end of the receiver.

Figure 9:
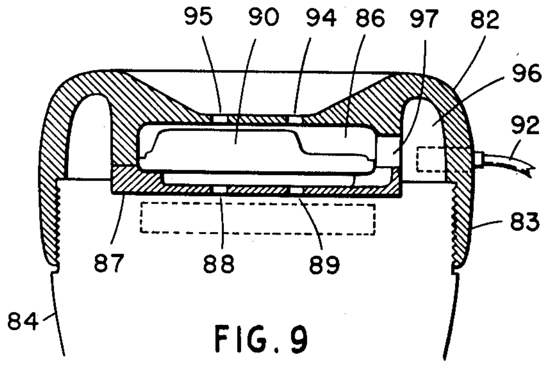
Fig. 9 is a sectional elevation of another form of pickup means.

A modification of the sound pickup means is shown in sectional elevation in Fig. 9. In this figure housing 82 has an annular flange 83 threaded internally to engage the threaded telephone receiver 84 when the cap (not shown), normally forming a part thereof, is removed. As in the foregoing embodiment the housing 82 has a central cavity 86 enclosed by a cap 87 perforated at 88, 89 etc. A microphone 90 disposed in the cavity picks up the sound projected from the receivers through the perforations 88, 89, etc. The sound is delivered from the microphone through a cable 92 to the hearing aid amplifier as above described.

Figure 6:
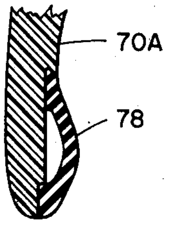
Fig. 6 is an enlarged sectional elevation of a portion of the pickup means shown in Fig. 5.

The device of Fig. 6 is designed to be a more or less permanent attachment to a telephone. The upper wall of the cavity 86 is perforated at 94, 95, etc. and the housing is flared outwardly from the perforated section to simulate the normal megaphone type construction of a telephone receiver. An annular recess 96 separates the microphone containing cavity from the annular flange 83 and opens into the cavity through a number of passageways, the passageway 97 being shown in the drawing. Sound issuing from the telephone receiver travels both through the perforations 88, 89 and through the annular passageway and cavity outwardly through the perforations 94, 95. An individual having normal hearing can use the apparatus shown in Fig. 6 without interference. At the same time an individual having impaired hearing may use the apparatus of Fig. 6 by connecting the cable 92 to the hearing aid amplifier as described.

Figure 10:
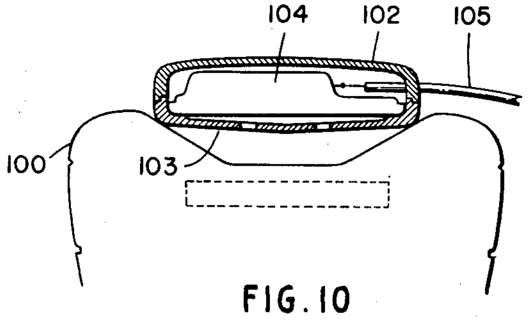
Fig. 10 is a sectional elevation of a third form of pickup means.

A simplified form of apparatus is shown in Fig. 10. This embodiment of the invention is adapted to be manually held against the telephone receiver 100 and includes a housing 102 having a perforated face plate 103 and enclosing a microphone 104. As in the foregoing embodiment the microphone 104 is connected through a cable 105, through an extension cord if desired, to the amplifier of the hearing aid.

The preferred form of the telephone attachment in accordance with the invention is that employing a microphone connected in one of the various manners shown to the hearing aid amplifier. However, I have made a less expensive telephone adapter including many of the features of the preferred adapter but employing acoustical rather than electrical transmissions.

Figure 11:
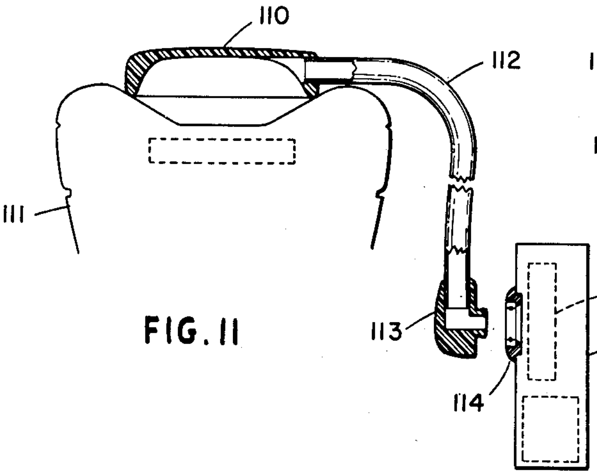
Fig. 11 is a diagrammatic view partly in section of an acoustic form of the apparatus.

The apparatus shown in Fig. 11 comprises a cup shaped sound pickup 110 which may be held manually against the telephone receiver 111 and which is connected to an acoustic tube 112. A snap fastener 113 on the outer end of the acoustic tube 112 is adapted to snap within a receptacle 114 mounted on a portion of the outer case of a conventional hearing aid 115. Sound transmitted through acoustic tube 112 is introduced into the hearing aid and picked up by the microphone 116 and is amplified in the hearing aid and transmitted to the ear receiver.

Figure 12:
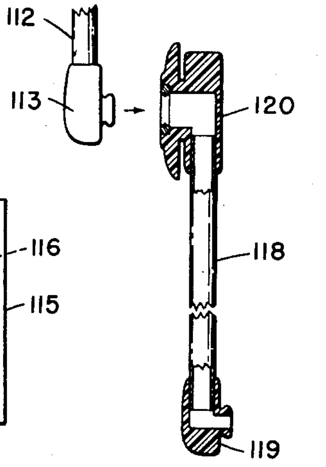
Fig. 12 is an elevation view partly in section of an extension means for use with the acoustic conducting apparatus.

As in the case of the microphone soundpickup apparatus I have also found it desirable to provide separate extension means for acoustic transmission from the sound pickup to the hearing aid microphone in the apparatus of Fig. 11. Such means are shown in Fig. 12 and include a snap plug 113 on the outer end of the acoustic tube 112 and an extension tube 118 having a snap plug 119 at one end and a snap socket 120 at the opposite end. As in the foregoing embodiment, the socket 120 may be provided with a clip for attaching it to the clothing and the plug 119 may be connected directly to the microphone of the hearing aid. At such time as it is desired to use the acoustic pickup 110 it is only necessary to insert the plug 113 into the socket 120. However, when the acoustic pickup 110 is not employed, attachment of the plug 119 to the snap ring 114 of the hearing aid will not interfere with the efficiency of the hearing aid for its normal use.

Figure 13:
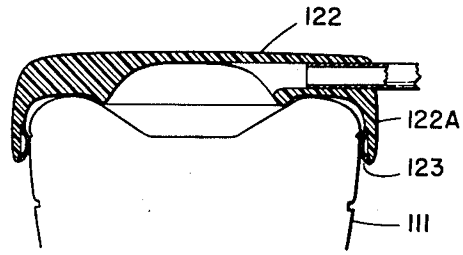
Fig. 13 is a sectional elevation showing a modification of the apparatus of Fig. 11.

Fig. 13 shows an acoustic pickup 122 similar in construction to the pickup 110 but having an annular flange 122A to which a resilient gasket 123 is affixed. Gasket 123 may be identical to the gasket 78 shown in Fig. 6 or the gasket 79 shown in Fig. 7, and serves the purpose of holding the sound pickup 122 to a telephone receiver 111. Alternatively an elastic band may be used in the manner illustrated in Fig. 8 to hold the pickup on the receiver.

Figure 14:
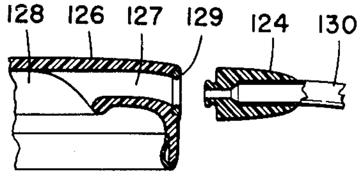
Fig. 14 is a sectional elevation showing a modification in the apparatus of Fig. 13.

Fig. 14 shows the application of a snap plug 124 to an acoustic receiver 126. A passageway 127, leading from the cavity 128 opens on the outside of the housing 126 and is provided with a snap ring 129 to retain the snap plug 124. Plug 124 is mounted on the end of an acoustic tube 130, the other end of which may be connected directly to the hearing aid case or to a plug and socket assembly of an extension tube.

Figure 15:
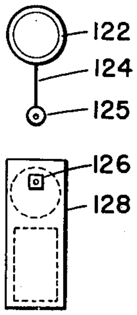
Fig. 15 is a diagram of one assembly.
Figure 16:
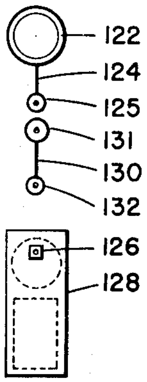
Fig. 16 is a diagram of an alternative assembly.

The various embodiments of the acoustic pickup device shown in Figs. 11, 12, 13 and 14 are illustrated diagrammatically in Figs. 15, 16. Thus in Fig. 15 an acoustic pickup, say pickup 122, is connected through an acoustic tube 124 to a snap plug 125 which may be connected directly to a snap socket 126 affixed to the outer case of the hearing aid 128.

In Fig. 16 the acoustic pickup 122 is connected through an acoustic tube 124 to a snap plug 125. An extension tube 130 is provided at one end with a snap socket 131 adapted to receive the plug 125 and at the other end with a snap plug 132 adapted to fasten in the socket 126 mounted on the grill work of the hearing aid 128.

I have described and illustrated improvements in hearing aid telephone adapters, involving improvements in sound pickup, improvements in means for holding the adapter to the telephone receiver and improvements in sound transmission all of which simplify and improve telephonic communication by persons of impaired hearing.

I claim:

1. In combination with a hearing aid having a microphone, amplifier and ear receiver, a sound pickup means remote from the hearing aid amplifier and microphone and adapted to be held against a telephone receiver and including an auxiliary microphone, and means for detachably connecting the auxiliary microphone to the hearing aid amplifier in parallel with the hearing aid microphone.

2. In combination with a hearing aid having a microphone and amplifier in a case and an ear receiver connected to the amplifier, a sound pickup means remote from the hearing aid amplifier and microphone and including a housing adapted to be detachably held against a telephone receiver, an auxiliary microphone disposed in the housing, and means for detachably connecting the auxiliary microphone to the hearing aid amplifier in parallel with the hearing aid microphone.

3. In combination with a hearing aid having a microphone and amplifier in a case and an ear receiver connected to the amplifier, a sound pickup means including a housing adapted to be detachably held against a telephone receiver remote from the hearing aid amplifier, an auxiliary microphone disposed in the housing, a jack mounted in a wall of the hearing aid case and connected to the amplifier in parallel with the hearing aid microphone, a pair of wires leading from the auxiliary microphone, an extension cord having a plug at one end adapted to be inserted in the jack, and a snap fastener adapted to connect the pair of wires to the other end of the extension cord.

4. Apparatus according to claim 2 wherein the means for detachably connecting the auxiliary microphone to the hearing aid amplifier comprises a jack mounted in a wall of the hearing aid case and being connected to the amplifier in parallel with the hearing aid microphone, a pair of wires leading from the auxiliary microphone and connected to a plug adapted to be inserted in the jack.

5. Apparatus according to claim 2 wherein the means for detachably connecting the auxiliary microphone to the hearing aid amplifier comprises a first jack mounted in the wall of the hearing aid case and being connected to the amplifier in parallel with the hearing aid microphone, a first pair of wires leading from the auxiliary microphone and connected to a plug, a coupling means including a second pair of wires, one end of each of the pair of wires being connected to a second jack adapted to receive the first mentioned plug, the opposite end of each of the second pair of wires being connected to a second plug adapted to be inserted in the first jack, and a clip affixed to the second jack for clipping the same to the user's clothing.

6. Apparatus according to claim 3 wherein the snap fastener comprises a first housing having a snap ring socket in one face thereof, one of said two wires being connected to the snap ring, the other of the two wires projecting from the same face of the housing and spaced from the snap ring, a second housing affixed to the end of the extension cord and having a first button adapted to snap within the snap ring, an annular groove in a face of the second housing having an annular metal ring disposed therein adapted to contact said other of said two wires, the extension cord being connected to the first snap button and to the annular ring, and a second snap button on an opposite face of the second housing for attaching the same to the user's clothing.

7. In combination with a hearing aid having a microphone and an amplifier connected and mounted in a common housing, and an ear receiver connected to the amplifier output, the improvement comprising electrical connection means mounted with respect to said housing so as to be accessible from the exterior thereof, means connecting the electrical connection means to the input of the amplifier independently of the microphone in the housing, and an auxiliary microphone disposed remote from the housing and detachably connected to said connection means whereby the auxiliary microphone is connected to said amplifier.

8. In combination with a hearing aid having a microphone and an amplifier in a case and an ear receiver connected to the output of the amplifier, an auxiliary microphone, a jack plug receptacle mounted in a wall of the hearing aid case and connected to the input of the amplifier, an extension cord having a jack plug at one end and connected at the other end to the auxiliary microphone, the plug end of the extension cord being adapted to be inserted in the jack plug receptacle whereby the auxiliary microphone may be detachably connected to the hearing aid amplifier when the auxiliary microphone is disposed exteriorly of and remote from the hearing aid case.

9. Apparatus according to claim 2 wherein the housing comprises a disk-shaped body enclosing a chamber between opposite perforate faces, a microphone disposed in the chamber including a continuous air space between the opposite perforate faces of the body and by-passing the microphone, and an electrical connector in a wall of the body connected internally to the microphone.

10. Apparatus according to claim 2 wherein the means for detachably connecting the auxiliary microphone to the hearing aid amplifier comprises a first electrical connector mounted in a wall of the hearing aid case and being connected to the amplifier in parallel with the hearing aid microphone, a pair of wires leading from the auxiliary microphone and connected to a second electrical connector adapted to be connected to the first electrical connector.

11. Apparatus according to claim 2 wherein the means for detachably connecting the auxiliary microphone to the hearing aid amplifier comprises a first electrical connector connected to the amplifier in parallel with the hearing aid microphone and accessible exteriorly of the case, a pair of wires leading from the auxiliary microphone and connected to a second electrical connector adapted to be connected to the first electrical connector.

12. Apparatus according to claim 2 wherein the means for detachably connecting the auxiliary microphone to the hearing aid amplifier comprises a first electrical connector connected to the amplifier in parallel with the hearing aid microphone and accessible exteriorly of the case, a second electrical connector associated with the auxiliary microphone and accessible exteriorly of the housing containing the auxiliary microphone, a pair of wires, third and fourth electrical connectors disposed respectively at opposite ends of the pair of wires and adapted to be connected to the first and second electrical connectors.

JANVIER F. O'HARA.

References Cited in the file of this patent

UNITED STATES PATENTS

| Number | Name | Date |
|---|---|---|
| Re. 22,198 | Loewe | Oct. 6, 1942 |
| 839,050 | Turner | Dec. 18, 1906 |
| 1,280,556 | Scher | Oct. 1, 1918 |
| 1,928,669 | Lybarger | Oct. 3, 1933 |
| 2,058,796 | Hogle | Oct. 27, 1936 |
| 2,160,829 | Cherry | June 6, 1939 |
| 2,294,048 | Provenzano | Aug. 25, 1942 |
| 2,402,341 | Patterson | June 18, 1946 |
| 2,530,621 | Lybarger | Nov. 21, 1950 |
| 2,554,834 | Lavery | May 29, 1951 |
| 2,582,287 | Shaper | Jan. 15, 1952 |

FOREIGN PATENTS

| Number | Name | Date |
|---|---|---|
| 495,171 | Great Britain | Nov. 8, 1938 |
| 589,918 | Great Britain | July 3, 1947 |